INVENTOR
HARRY E. KENNEDY
BY
D.C. Harrison
ATTORNEY

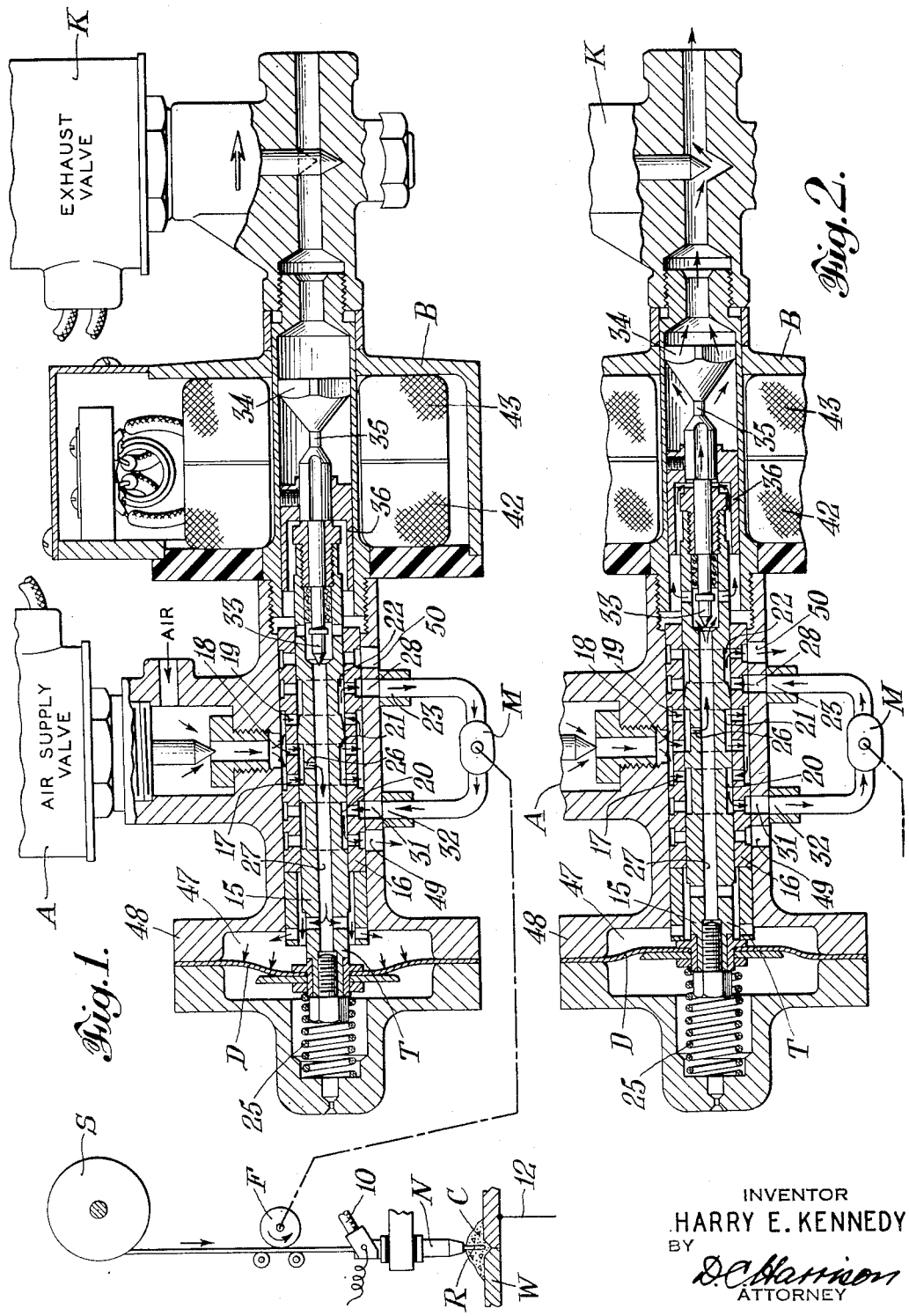

Patented Feb. 24, 1953

2,629,365

UNITED STATES PATENT OFFICE 2,629,365

ELECTROPNEUMATIC CONTROL SYSTEM

Harry E. Kennedy, Berkeley, Calif., assignor, by mesne assignments, to Union Carbide and Carbon Corporation, a corporation of New York Application March 11, 1949, Serial No. 80,911

6 Claims. (Cl. 121—46.5)

This invention relates to electro-pneumatic control systems, and more particularly to an improved system for automatically controlling the speed of feeding, driving or traversing mechanisms in response to electrical characteristics.

My Patent No. 2,423,190 granted July 1, 1947 describes an electro-magnetic valve which controls the operation of a fluid operated motor. This motor is connected through suitable gearing to feed rolls which cause a continuous motion of the electrode as it is consumed. The electro-magnetic valve monitors the motor in such a manner that the voltage in the welding zone remains constant. As higher welding speeds have been attained more accurate control becomes necessary.

It is, therefore, the main object of the present invention to provide supplementary auxiliary or booster means for actuating a control valve for an air motor which is controlled by an electrical characteristic.

Other objects are to increase the accuracy of electromagnetic control for the electrode feeding air motor, to provide a self-starting system, to provide a system which will retract the electrode when the electrode is energized and in electrical contact with the work, which is capable of operating either on alternating or direct current, and which will maintain constant, adjustable welding voltage during welding.

According to the present invention a reversible air motor is employed, the direction of operation of which is controlled by a piston valve which controls the direction of air flow through the motor. This piston valve is in turn controlled by a solenoid valve responsive to the welding voltage, to render the speed of the motor proportional to the welding voltage.

In the drawings:

Fig. 1 is a view partly diagrammatic and partly in cross-section of an electro-pneumatic control system illustrating the invention, the valve parts being shown in their rod feed "inch" position;

Fig. 2 is a fragmentary view similar to Fig. 1 of the valve parts in their rod retract "inch" or retract start position.

Figure 3:
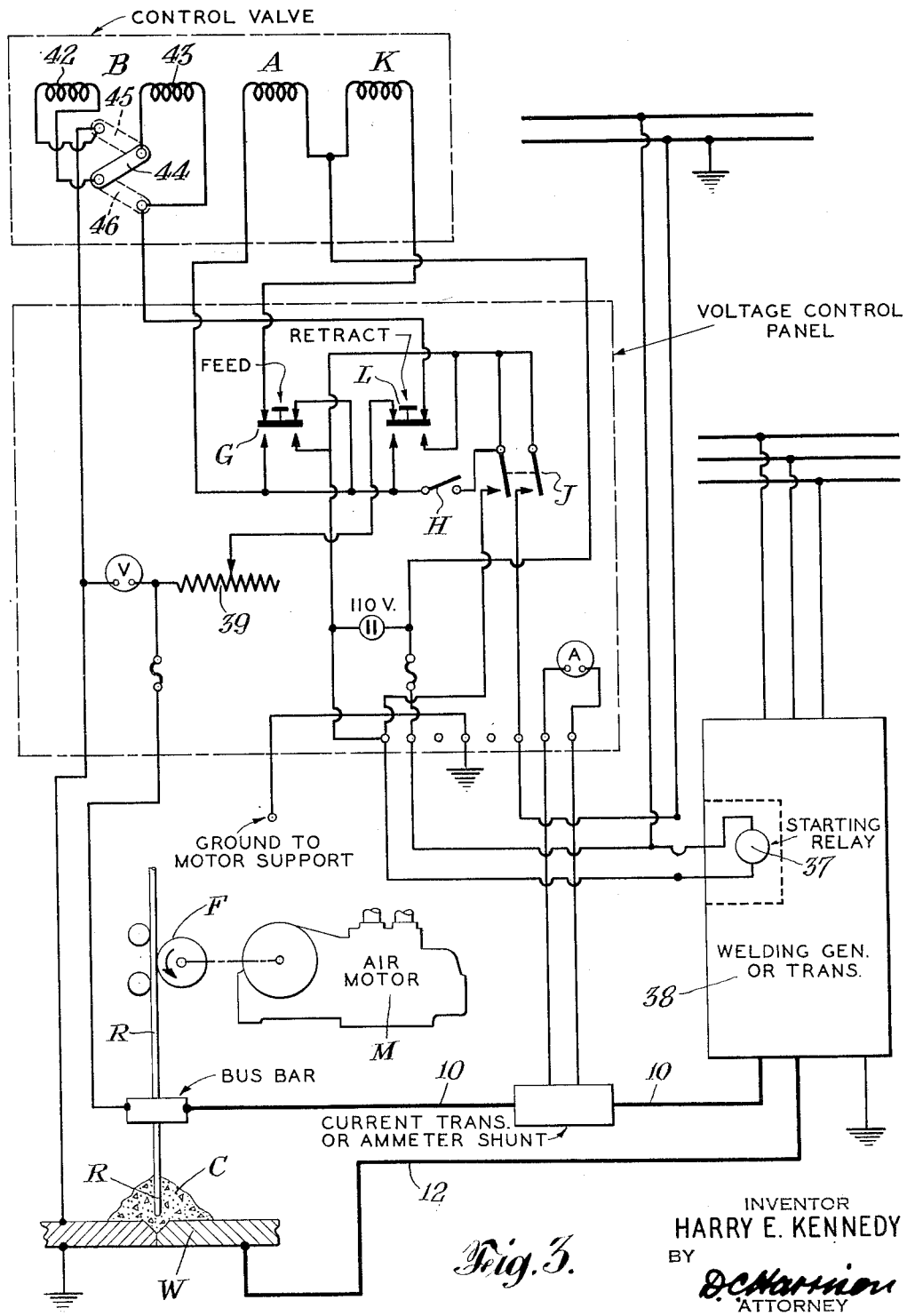
Fig. 3 is a wiring diagram of the system.

Referring to Fig. 1 of the drawings a compressed air motor M drives a rod feeding device F, which feeds welding rod R from a rod supply reel S through a nozzle N toward the welding zone. Welding current is conducted to the upper portion of the nozzle N through a cable 10. As shown in Fig. 3 another cable 12 is connected to the work W. Thus when the machine is operating, a welding zone is established between the end of the welding rod R and the work W. This zone is normally covered in submerged melt welding with a welding medium C under which the lower end of the welding rod R progressively fuses as the welding zone moves with the machine.

The control mechanism according to the present invention comprises a throttle slide valve T interposed between an air supply valve A and the air motor M; a diaphragm D for actuating the slide valve T, and a solenoid valve B cooperating with the slide valve T for controlling its operation.

The throttle slide valve T comprises a hollow piston 15 slidable in a stationary sleeve 16 having ports 17, 18 and 19 in communication with the air supply valve A. The piston 15 has circumferential grooves 20, 21 and 22 which conduct air from the sleeve ports to the air motor forward inlet 23.

The diaphragm D is secured to the forward end of the piston 15, and is opposed by a spring 25 which urges the piston 15 toward the retracted or reversing position. The piston 15 is provided with a small calibrated hole 26 which passes air from the air supply valve A to the central bore 27 in the piston. The bore 27 communicates with the pressure side of the diaphragm D, which in turn moves the piston 15 to the forward drive position.

In the forward drive position of the slide valve, air from the valve A passes through the opened sleeve port 19, around the annular piston groove 22 through the opened sleeve port 28 (Fig. 1) to the forward drive motor inlet 23.

When the exhaust valve K is opened (Fig. 2), no pressure can build up in the diaphragm chamber, so that the spring 25 thrusts the slide valve to reverse drive position. Air from the valve A now passes through opened sleeve port 17, piston groove 20, and opened sleeve port 31 to the reverse drive motor inlet 32.

The rear end of the piston bore 27 is entered by a needle valve 33 carried by the armature 34 of the solenoid valve B. The valve 33 is incapable of completely closing, but only of operating to vary the flow of exhaust air through the passage controlled by valve 33. The slide valve T moves away from the needle valve 33 as the needle valve moves toward the slide valve.

The armature 34 has a magnetic restriction 35 to cause that part of the circuit to become saturated. This causes the force on the valve to become more nearly linear with the coil voltage. The movement of the armature 34 is damped by eddy currents generated in a copper shell 36 attached to the armature 34.

The wiring shown in Fig. 3 comprises a contactor switch J in series with a starting relay 37, which controls the welding generator or transformer 38, which supplies welding current to the conductors 10 and 12. A rod feed switch H is in series with the operating solenoids of the air supply valve A and the exhaust valve K.

In shunt with the arc is a circuit which includes in series a rheostat 39, the normally closed contacts of a retraction switch L, and the solenoid valve B. The solenoid valve B is wound with two coils 42 and 43, which may be placed in series or parallel. For direct current operation these coils are connected in series by a link 44, and for alternating current operation they are connected in parallel by links 45 and 46.

The operating solenoid of exhaust valve K is in series with the normally closed contacts of the rod-feed inching button switch G and with the normally open contacts of the rod retraction inching button switch L.

To set the mechanism to start the weld, the switch G and the rod feed switch H are closed, which opens air supply valve A and closes exhaust valve K, causing forward drive of the motor M until the rod R makes contact with the work, at which time the switch G is released and valve A is closed, exhaust valve K is opened and the motor M stops. The tip of the electrode R is now covered with granular fusible welding material C as described in my Patent 2,423,190 hereinbefore referred to.

To start the welding operation the contact switch J and the rod feed switch H are closed, which completes the welding current circuit and opens the valve A allowing air to flow to the reverse port of the rod feed motor M. This raises the tip of the rod R from the work W, thus producing a submerged arc which fuses the material C, the work W and the rod R to establish the welding action. The voltage which then occurs between the rod R and the work W is applied to the control solenoid B. This creates a magnetic field within this solenoid which tends to draw the armature into the solenoid. This action causes the valve 33 to restrict the small flow of exhaust air which enters the hollow piston through the calibrated orifice 26. The air pressure against the diaphragm D opposes the magnetic force of the solenoid B to produce equilibrium during welding. The flow of air through orifice 26 results in an increase in pressure on the diaphragm D which tends to move the slide valve against the opposition of the spring 25 toward the forward operating position for the air motor.

Thus when the tip of the rod R is raised from the work W to establish welding conditions, as the gap between the tip of the rod and the work increases, likewise the welding voltage increases, causing the voltage solenoid armature and the slide valve to move forward into the rod feed position. The entire action takes place in a fraction of a second, and the weld is started without the usual high welding voltage. The desired welding voltage can be selected by adjusting rheostat 39.

A further increase in welding voltage results in a greater opening of the slide valve, thereby increasing the electrode motor speed to a value which has been preset by the adjustable resistance 39.

To stop the welding action, the rod feed switch H is opened, which extinguishes the arc. This allows the piston 15 to return to reverse position, while pushing inching button L will insure an air supply by keeping valve A open. The advantage of this feature is that it permits shutting off the welding current at the welding voltage.

The arrows in Fig. 1 trace the path followed by the air when the slide valve T is controlled by the welding voltage (assuming that the exhaust valve K is energized and open, as shown in dotted lines) and the motor is running in a rod-feed direction. The air first passes through the main air supply valve A, enters the small calibrated hole 26 in the center of the piston 15, enters the closed air chamber 47 of casing 48 housing the diaphragm, and applies pressure against the diaphragm D which is fastened to one end of the piston 15. This causes the piston to move and act as a slide valve, opening or closing the ports controlling the direction and amount of air flow to the rod feed motor via ports 28 and 31. The spring 25 causes the piston to rest normally in the reverse position (at the right), but when air pressure is applied to the diaphragm, it moves the piston to the left to cause the air to flow through the air motor M in the direction of the arrows so that the motor is driven in the rod feeding direction, the air exhausting through port 49.

The small pilot needle valve 33 which is attached to the armature 34 of the solenoid B is controlled by the welding voltage. When air first enters the valve T, the resulting pressure on the diaphragm D causes the piston 15 to move to the left. The armature 34, which is held in a position dictated by the magnitude of the welding voltage applied to the solenoid B, does not allow the needle valve 33 to move, and the piston 15 moves away from the needle valve 33. This creates an escape passage past the needle valve and through the open exhaust valve K that reduces the air pressure on the diaphragm D and causes the piston 15 to stop its motion to the left. There is always air flow through the needle valve 33 as long as the exhaust valve K is open. Exhaust valve K closes only when the air motor M is controlled by the rod-feed "inching" button switch G. The spring 25 on the opposite side of the diaphragm D tends to return the piston 15 to the reversing position. It is prevented from going all the way, however, by the air pressure on the diaphragm which, all the while, is being continuously metered in by the small calibrated hole 26 in the piston.

The spring pressure and the air pressure thus reach a balance. When this occurs the piston-regulated air ports leading to the motor M remain constant and the motor runs at a constant speed. The rod-feed rate is automatically maintained until the voltage imposed on the welding voltage solenoid B changes.

When the gap between the tip of the welding rod R and workpiece W increases, the welding voltage also increases. Such increase in voltage causes the solenoid armature 34 and attached needle valve 33 to move to the left and prevent relief of the air pressure on the diaphragm. The resulting increase in air pressure forces the diaphragm to move the attached piston 15 to the left and begin opening wider the rod-feed air ports to the motor. The motor thereupon speeds up and feeds rod to the welding zone faster. This begins to close the welding gap and reduces the voltage applied to the solenoid B until the voltage value determined by adjustment of rheostat 39 is reached.

When the gap between the tip of the welding rod R and the workpiece W decreases, the opposite sequence of events takes place. A decrease in welding voltage causes the core 34 and needle valve 33 to move to the right, the air pressure on the diaphragm decreases, the piston begins closing the rod feed ports, the motor slows down and the slower rod feed causes the gap and the welding voltage to increase and approach the preset value.

Both operations take place many times a second and the correct welding voltage is maintained substantially at the preset value.

Fig. 2 traces the path of the air when the valve T is under control of the retract "inching" button switch L and the motor is running full speed in reverse. In such case the welding voltage solenoid B is de-energized, and both exhaust valve K and main air supply valve A are open. Air enters the piston 15 through the calibrated hole 26 as before, but cannot build up pressure in chamber 47 against the diaphragm D because the needle valve 33, no longer held in place by the (de-energized) welding voltage solenoid B, allows the air to escape from the piston and out through the open exhaust valve K to the atmosphere. Instead, the spring 25 forces piston 15 to the right, allowing the air to enter the motor through reverse port 31, the air being exhausted in such case via exhaust port 50.

I claim:

1. In an electro-pneumatic control system comprising an air motor, the improvement which comprises a slide valve having a hollow piston slidable in a stationary sleeve having ports in communication with an air supply, said piston having circumferential grooves which conduct air from the sleeve ports to the air motor, said piston also having a small hole which passes air to the interior of the piston, a diaphragm mounted on said hollow piston for sliding said piston in said sleeve in response to the pressure of the air therein, a solenoid having an armature provided with normally open needle valve cooperating with one end of said hollow piston, and responsive to energization of the solenoid for controlling said air valve, a casing housing said diaphragm and having a chamber on one side thereof in communication with the interior of the piston valve so that movement of the needle valve controls air pressure acting on the diaphragm, and means including a valve for exhausting the air flowing through said needle valve to the atmosphere.

2. An electro-pneumatic control device comprising the combination with an air slide valve, of a solenoid valve, in which the air slide valve comprises a piston having a central bore, and a diaphragm and spring operatively associated with said piston, said piston having a relatively small hole which passes air from the air inlet side of the slide valve to the bore in the piston, a casing housing said diaphragm providing a closed air chamber, the side of said diaphragm opposite the force of said spring being in communication with the air in the bore, whereby the position of the piston is determined thereby, and in which the solenoid valve comprises an armature having a needle valve entering the central bore and normally providing a restricted exhaust opening for the flow of air therefrom, whereby energization of the solenoid controls the position of the needle valve, which in turn controls the air pressure acting on the diaphragm and the position of the piston, thereby regulating the flow of air through the valve.

3. In an electro-pneumatic control system comprising an air supply valve and an air motor having forward and reverse drive inlets, the combination comprising an air slide valve interposed between such valve and motor inlets, a diaphragm for actuating said slide valve, a casing housing said diaphragm whereby one side thereof is responsive to air pressure, and a solenoid valve cooperating with said slide valve for controlling its operation, said slide valve comprising a stationary sleeve having ports in communication with such air supply valve, a hollow piston slidable in said sleeve, said piston having circumferential grooves which conduct air from said sleeve ports to such motor, said diaphragm being secured to the forward end of said piston, a spring urging said piston toward retracted position, said piston having a hole which passes air from the air supply valve to the central bore in the piston, said bore communicating with the air pressure side of the diaphragm which in turn moves the piston toward forward position in which air from the supply valve passes through one of the sleeve ports, around one of the annular grooves, through another sleeve port and to the forward drive inlet of the air motor; said spring opposing such forward movement of the piston valve, said solenoid valve having an armature provided with a normally open needle valve cooperating with the rear end of such piston bore to vary the flow of exhaust air therefrom and thereby controlling the air pressure on said diaphragm, the diaphragm moving the slide valve forwardly away from the needle valve as the needle valve moves toward the slide valve, and means whereby force on the armature is substantially linear with the voltage applied to the solenoid.

4. In an electro-pneumatic control system comprising an air motor and means for deriving a voltage proportional to the speed thereof, the improvement which comprises a slide valve comprising a stationary sleeve, and a piston slidable in said sleeve, said piston and sleeve having cooperative port and groove means for controlling the flow of air to said motor, depending upon the relative position of the piston in the sleeve, an air pressure responsive diaphragm and an opposing spring operatively associated with said piston, a casing housing said diaphragm having a closed air chamber, said piston having a central bore and a relatively small hole for passing air into such bore, which is in communication with said air chamber on the side of said diaphragm opposing the force of said spring, and a solenoid valve comprising an armature having a needle valve entering one end of such bore, the normal position of said needle valve being open to exhaust air from such bore, and means whereby the force acting on said armature is substantially linearly proportional to the voltage applied to the solenoid, so that with any increase in such voltage, the needle valve moves to restrict the flow of air exhausted from such bore, causing the diaphragm to move the piston in the same direction due to the resulting increase in air pressure on the diaphragm.

5. In a system as defined by claim 4, conduit means for conducting air exhausted from said needle valve to the atmosphere, and an exhaust valve associated with such conduit means for shutting-off the air from being exhausted from such needle valve, whereby to cause the full air pressure in the slide valve to be applied against said diaphragm so that the slide valve is actuated against the force of the spring to fully open the port and groove means leading to the motor as long as such needle valve exhaust air is shut-off by the closure of said exhaust valve.

6. In an electro-pneumatic control system comprising an air motor for controlling means in accordance with a voltage, the improvement which comprises an air supply valve, a slide valve comprising a stationary sleeve, a piston slidable in said sleeve, said piston and sleeve having cooperative port and groove means for controlling the flow of air from the air supply valve to said motor in accordance with the position of said piston, a diaphragm secured to said piston, a spring opposing forward movement of said piston, a casing housing said diaphragm having a closed air chamber, said piston having a central bore in communication with said diaphragm, said piston also having a metering hole which passes air from said air supply valve into such bore, a solenoid valve comprising an armature having a normally open needle valve entering the other end of said bore, and means for energizing the coil of said solenoid valve in accordance with such voltage, comprising a control circuit containing an adjustable resistance for preselecting the voltage, whereby any tendency of the voltage to depart from the selected value causes the solenoid valve to change the position of the needle valve relative to the piston which changes the flow of exhausted air, the relative air pressure on the diaphragm, the longitudinal position of the piston in the sleeve, the flow of air to the motor and the speed of such motor, so that such tendency is prevented by an automatic shift in the rate of said voltage controlling means which consequently restores the voltage to the selected value.

HARRY E. KENNEDY.

REFERENCES CITED

The following references are of record in the file of this patent:

UNITED STATES PATENTS

| Number | Name | Date |
| --- | --- | --- |
| 245,591 | Westinghouse | Aug. 9, 1881 |
| 544,529 | Cunningham | Aug. 13, 1895 |
| 1,562,204 | Carlstedt | Nov. 17, 1925 |
| 1,680,667 | Curtis | Aug. 14, 1928 |
| 2,225,321 | Schwendner | Dec. 17, 1940 |
| 2,237,038 | Moore | Apr. 1, 1941 |
| 2,422,362 | Moore | June 17, 1947 |
| 2,423,190 | Kennedy | July 1, 1947 |
| 2,520,115 | Cahill | Aug. 29, 1950 |

FOREIGN PATENTS

| Number | Country | Date |
| --- | --- | --- |
| 233,110 | Germany | Mar. 29, 1911 |
| 504,563 | France | Apr. 17, 1920 |
| 556,079 | France | Apr. 6, 1923 |